United States Patent [19]

Van Antwerp

[11] Patent Number: 4,482,166
[45] Date of Patent: Nov. 13, 1984

[54] HITCHING GUIDE

[76] Inventor: Ferne R. Van Antwerp, R.R. 1, Unionville, Iowa 52594

[21] Appl. No.: 406,334

[22] Filed: Aug. 9, 1982

[51] Int. Cl.³ .............................................. B60D 1/04
[52] U.S. Cl. ........................... 280/479 A; 280/478 A; 280/478 B; 280/508
[58] Field of Search ........... 280/479 A, 479 R, 478 R, 280/478 A, 478 B, 477, 508, 509, 415

[56] References Cited

U.S. PATENT DOCUMENTS

| 2,544,181 | 3/1951 | Richey ............................ 280/479 A |
| 2,671,673 | 3/1954 | Benson . |
| 2,904,349 | 9/1959 | Frieberg . |
| 2,983,523 | 5/1961 | Kienzle . |
| 3,420,549 | 1/1969 | Robinson . |
| 3,695,630 | 10/1972 | Zucca . |
| 3,716,253 | 2/1973 | Gniffke et al. . |
| 3,863,955 | 2/1975 | Muncke et al. . |
| 4,343,484 | 8/1982 | Van Antwerp ................. 280/479 A |

FOREIGN PATENT DOCUMENTS 937035  9/1963  United Kingdom .

Primary Examiner—Joseph F. Peters, Jr.
Assistant Examiner—Donn McGiehan
Attorney, Agent, or Firm—Henderson & Sturm

[57] ABSTRACT

A hitching guide including a guide block movable between a lowered hitching position and a raised hitched position. The guide block includes forwardly converging sides disposed to contact and laterally align the draft tongue in aligned relationship with a hitch pin. As the draft tongue moves to the hitching position, the forward end of the draft tongue contacts the converging sides and the aperture of the draft tongue is disposed immediately adjacent the hitch pin. As the hitch pin engages the aperture in the draft tongue and the draft tongue moves to the hitched position, the forward end of the draft tongue moves to a spaced relationship with respect to the converging sides. The forwardly converging sides are vertically spaced from the hitch pin such that the draft tongue is free to pivot laterally beyond the converging sides when the draft tongue is in the hitched position. The hitching guide is adapted for use with a draft vehicle such as a pick-up truck or a conventional tractor having a hydraulic power-lift system.

21 Claims, 17 Drawing Figures

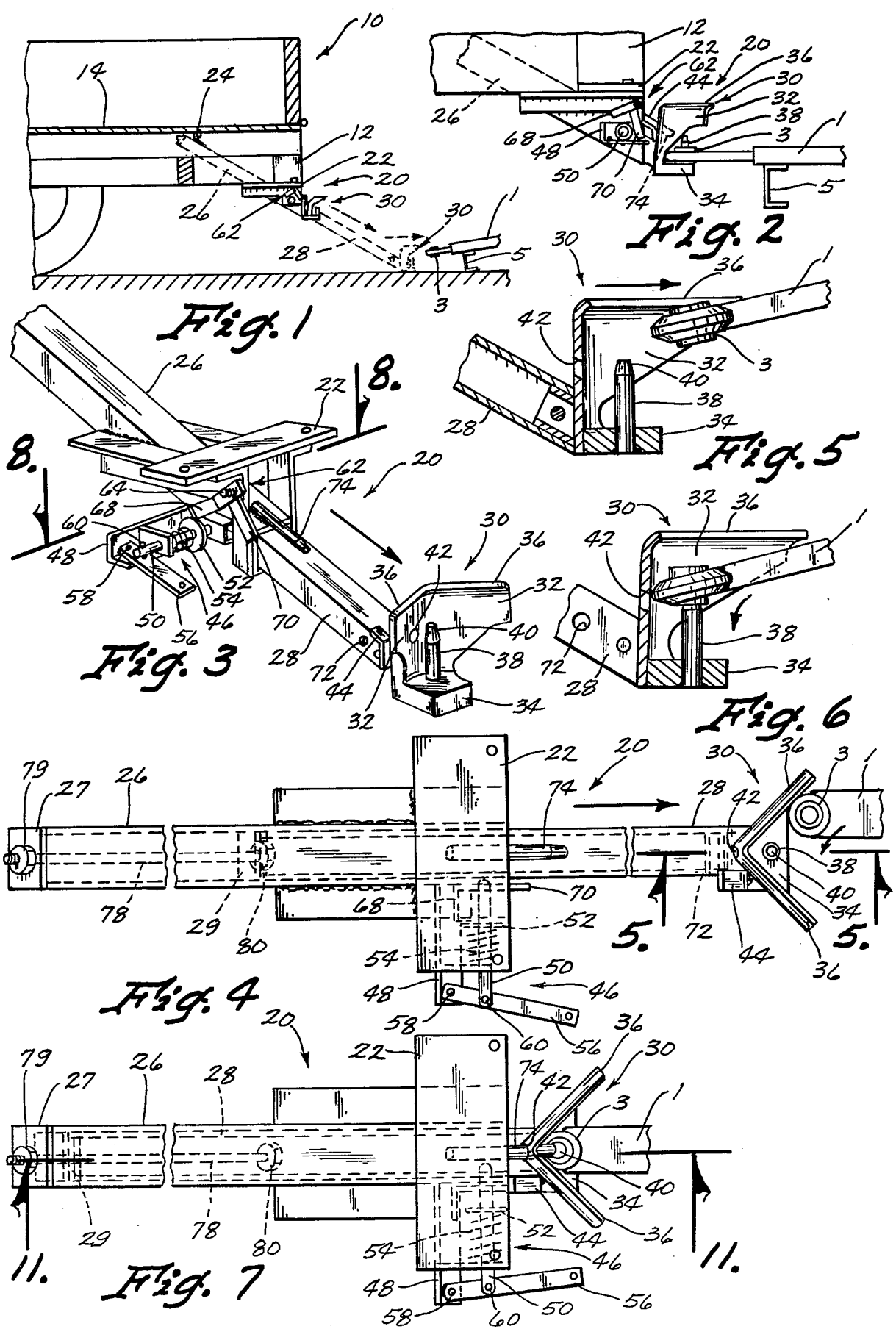

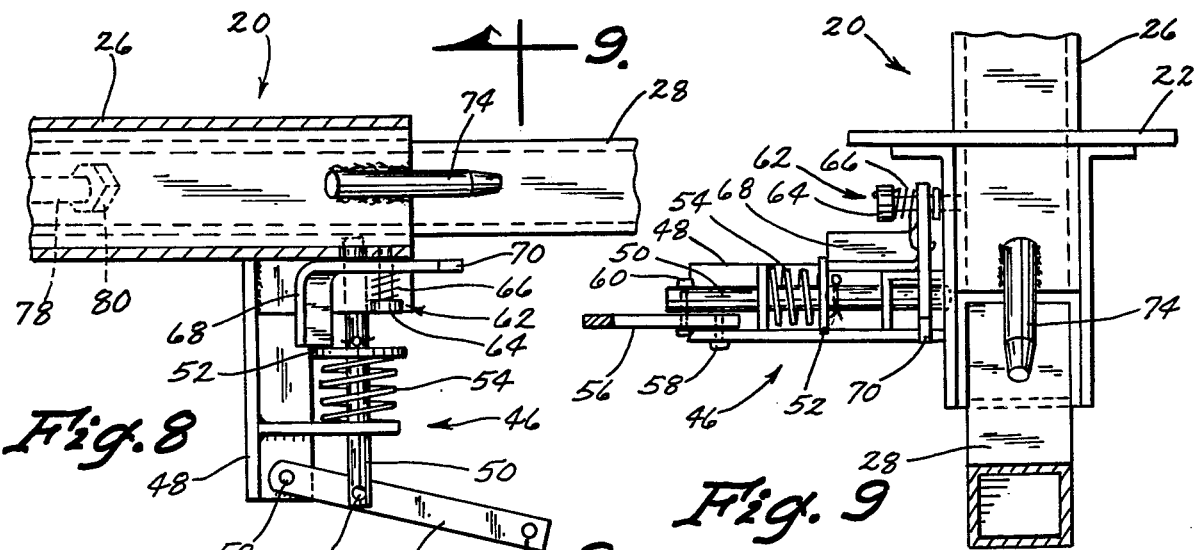
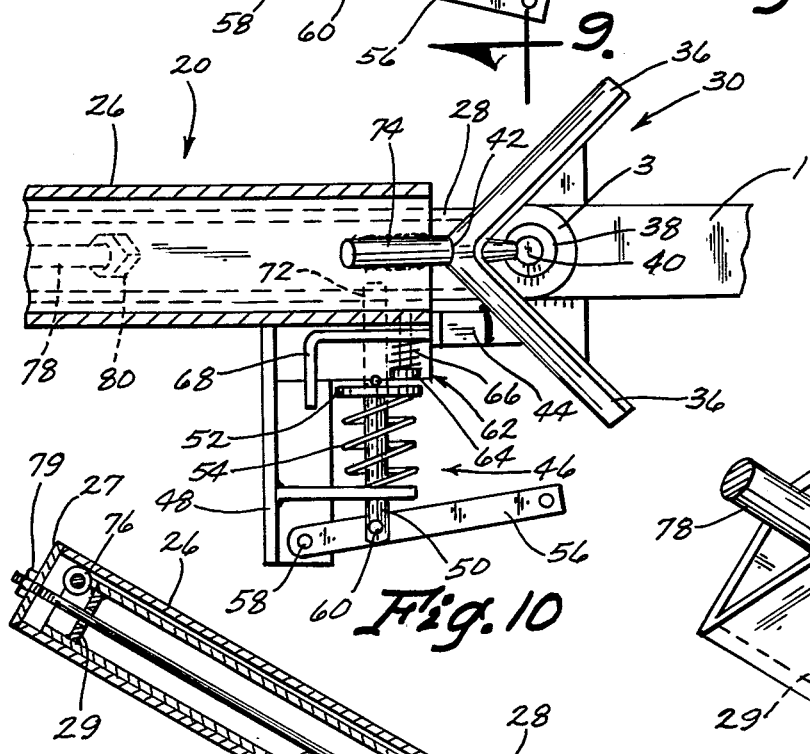
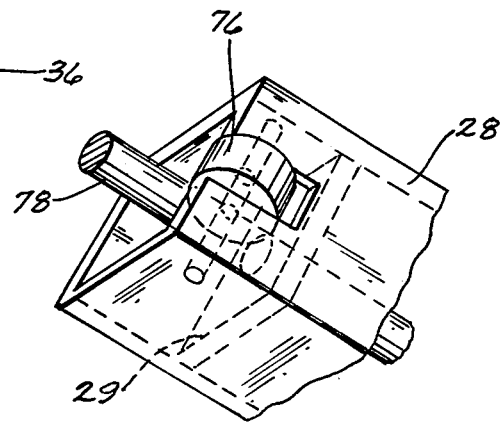
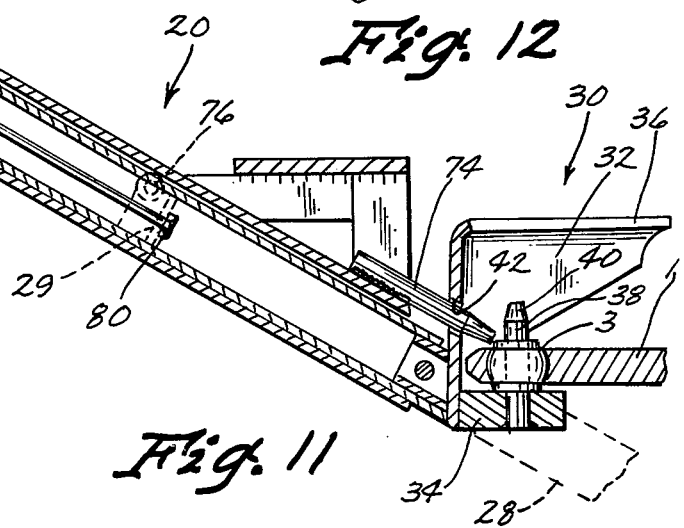

U.S. Patent  Nov. 13, 1984  Sheet 3 of 3  4,482,166
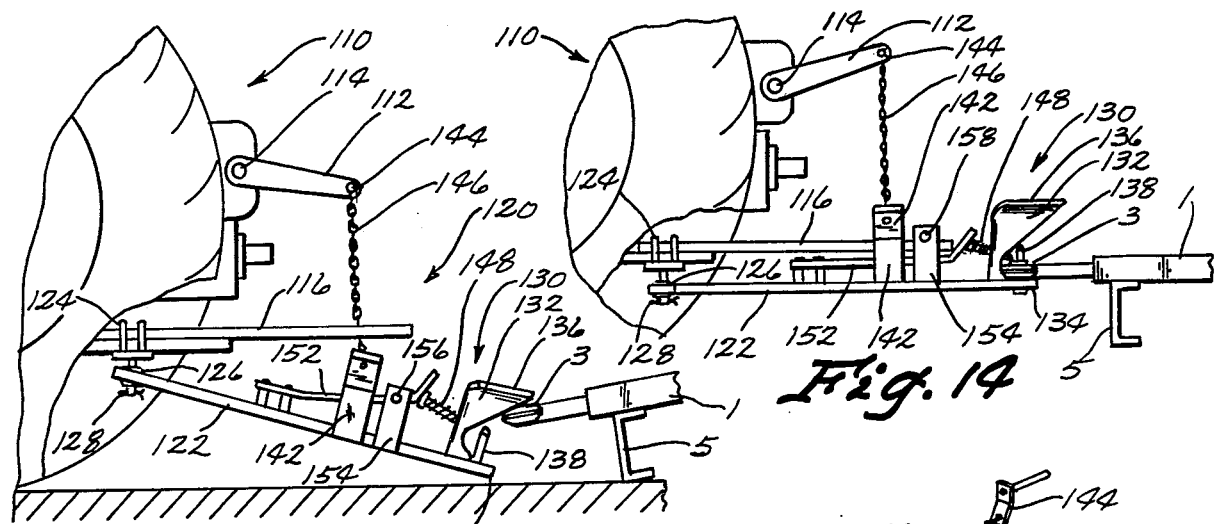
Fig. 13
Fig. 14
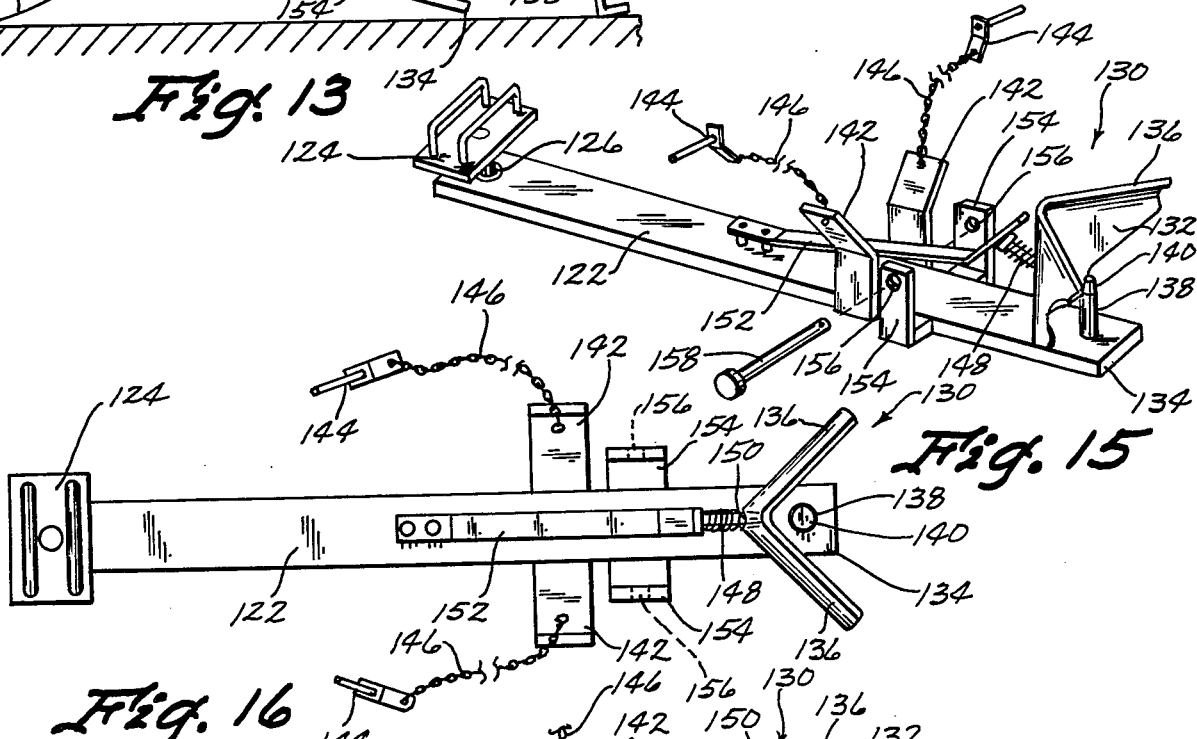
Fig. 15
Fig. 16
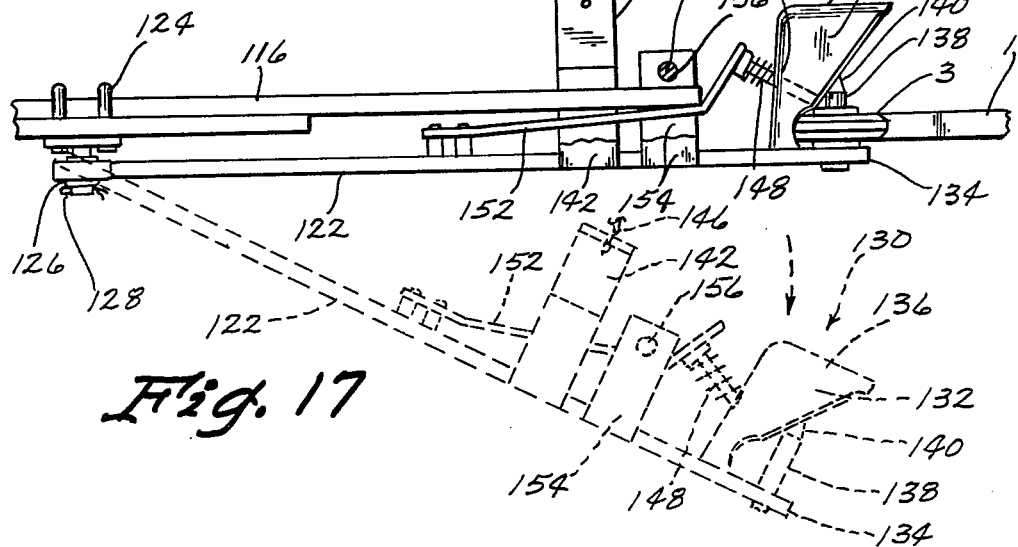
Fig. 17

HITCHING GUIDE

BACKGROUND OF THE INVENTION

The present invention relates generally to hitching devices and more particularly to a hitching guide to connect trailing implements or vehicles to prime movers.

Hitching devices presently available have several disadvantages including highly complex structures incorporating levers, rods, cables or the like extending to the operator's station. Further, these complex structures require a great deal of operator time to install and disassemble which limits the flexibility of the draft vehicle. Those concerned with these and other problems recognize the need for an improved hitching guide.

SUMMARY OF THE INVENTION

The present invention discloses a hitching guide for connecting implements or trailing vehicles to a prime mover. The hitching guide includes a guide block having forwardly converging sides disposed to contact and laterally align a draft tongue in an aligned relationship with a hitch pin. As the draft tongue moves to the lowered hitching position, the aperture in the draft tongue is aligned in mating relationship with the hitch pin. As the hitching guide is raised, the draft tongue moves to the raised hitched position, and the draft tongue moves from contacting relationship with the converging sides to a spaced relationship with the converging sides thereby allowing the free lateral movement of the draft tongue. Further, the forwardly converging sides are vertically spaced from the hitch pin and the draft tongue is thus free to move laterally beyond the converging sides when the draft tongue is in the hitched position. Further, when the draft tongue is in the hitched position, a locking device extends toward the free end of the hitch pin which prevents the draft tongue from disengaging from the hitch pin. The edge of the forwardly converging sides includes a rearwardly extending flange which aids in guiding the draft tongue to the hitching position.

The hitching device of the present invention is adapted for use with a prime mover such as a pick-up truck or a conventional tractor having a hydraulic power-lift system. In use with a pick-up truck, the hitching guide is lowered to the hitching position by gravity and the pick-up truck is backed to a position where it contacts the draft tongue. On contact with the draft tongue, the hitching guide is forced upwardly to the hitched position.

In use with a conventional tractor having a hydraulic lift system, the hitching guide is lowered and raised with the hydraulic lift arms of the tractor.

An object of the present invention is the provision of an improved hitching guide.

Another object is to provide a hitching guide that facilitates the hitching operation with minimum inconvenience to the operator.

A further object of the invention is the provision of a hitching guide that is easy to operate and maintain.

Still another object of the invention is to provide a hitching guide that is easily installed on or dismounted from a draft vehicle.

A still further object of the present invention is the provision of a hitching guide that allows free lateral movement of a draft tongue when the draft tongue is in the hitched position.

Yet another object of the present invention is to provide a hitching guide that allows for accurate alignment of the draft tongue sufficient to provide for functional use of the open center ball type hitch with a hitching guide.

Further objects, advantages and novel features of the present invention will become apparent from the following detailed description of the invention when considered in conjunction with the accompanying drawings.

BRIEF DESCRIPTION OF THE DRAWINGS

FIG. 1 is a side elevational view showing the hitching guide attached to a pick-up truck wherein the hitching guide is shown in dashed lines when in the lowered hitching position;

FIG. 2 is an enlarged side elevational view similar to FIG. 1 wherein the hitching guide is shown in the raised hitched position;

FIG. 3 is a perspective view showing the hitching guide in the lowered hitching position;

FIG. 4 is a top plan view showing the hitching guide in the lowered hitching position where the draft tongue is contacting one of the converging sides of the hitching guide and moving toward the aligned position with the hitch pin;

FIG. 5 is an enlarged sectional side elevational view, taken along line 5—5 of FIG. 4, showing the draft tongue contacting one of the converging sides and moving toward the aligned position with the hitch pin;

FIG. 6 is an enlarged side elevational view showing the draft tongue in aligned position with the hitch pin wherein the forward end of the draft tongue is contacting the converging sides and the swivel socket aperture is aligned immediately above the hitch pin;

FIG. 7 is a top plan view showing the hitching guide in the raised hitched position wherein the safety latch pin is disposed adjacent to the hitch pin, thus preventing the draft tongue from disengaging from the hitch pin;

FIG. 8 is a top plan view, taken along line 8—8 of FIG. 3, showing the release latch mechanism when the hitching guide is moved to the lowered hitching position;

FIG. 9 is a rear elevational view, taken along line 9—9 of FIG. 8, showing the release latch mechanism;

FIG. 10 is a top plan view showing the draft tongue in the raised hitched position wherein the safety latch pin is moved adjacent the hitch pin, thus preventing the draft tongue from disengaging from the hitch pin;

FIG. 11 is a sectional side elevational view, taken along line 11—11 of FIG. 7, which shows the internal friction roller and an internal stop mechanism which limits the distance of travel of the hitching guide as it moves to the lowered position (shown in dashed lines);

FIG. 12 is an enlarged perspective view showing the internal friction roller;

FIG. 13 is a side elevational view showing the hitching guide used in conjunction with a conventional tractor, wherein the hitching guide is lowered to the hitching position;

FIG. 14 is a side elevational view showing the hitching guide in the raised hitched position wherein the safety pin is disposed adjacent the hitch pin to prevent the draft tongue from disengaging from the hitch pin;

FIG. 15 is a perspective view showing the hitching guide adapted for use with a conventional tractor;

FIG. 16 is a top plan view showing the tractor hitching guide; and

FIG. 17 is a side elevational view showing tractor hitching guide in both the raised hitched position and the lowered hitching position (dashed lines).

DESCRIPTION OF THE PREFERRED EMBODIMENTS

Referring now to the drawings wherein like reference numerals designate identical or corresponding parts throughout the several views, FIG. 1 shows the hitching device of the present invention mounted on a pick-up truck which is generally designated by the reference numeral 10. The hitching guide, generally designated by reference numeral 20, is attached by mounting plate 22 and bracket 24 to pick-up frame member 12 and the under side of the pick-up box 14, respectively.

As best shown in FIG. 3, the hitching guide 20 includes a downwardly and rearwardly inclined tubular housing 26 which encloses a telescoping shaft 28. The guide block 30 is attached to the distal end of shaft 28 and includes a pair of forwardly converging sides 32 which extend upwardly from the base 34. Forwardly converging sides 32 include a rearwardly extending flange 36 at the upper edge thereof. Base 34 supports an upwardly extending hitch pin 38 which has an upper tapered portion 40. The converging sides 32 also extend upwardly from the front of base 34 and sides 32 are vertically spaced above the body of hitch pin 38 such that the area lateral of the hitch pin 38 is open. Lock pin opening 42 is formed at the converging point of sides 32 and is disposed adjacent the upper portion 40 of hitch pin 38.

The forward portion of guide block 30 also includes a latch release 44 attached to one side thereof. Also attached to a corresponding side of tubular housing 26 is a release latch mechanism generally designated by the numeral 46. The release latch 5 mechanism 46 includes a support bracket 48, into which is journaled a release pin 50. Release pin 50 includes an enlarged portion 52 and compression spring 54 encases a portion of release pin 50 between the enlarged portion 52 and bracket 48. Lever 56 is pivotally attached to support bracket 48 and pivotally attached to release pin 50 at points 58 and 60, respectively. An outward force directed on lever 56 will release pin 50 laterally outward from tubular housing 26.

Release pin stop 62 is pivotally attached to tubular housing 26 by projection 64. Spring 66 encircles projection 64 and is disposed between the enlarged head of projection 64 and release pin stop 62. Release pin stop 62 includes a forward tab 68 which drops by gravity to engage the enlarged portion 52 and hold release pin 50 in the outwardly extended position. The rearward tab 70 of release pin stop 62 extends rearwardly for engagement with latch release 44 as telescoping shaft 28 is moved upwardly, thus freeing release pin 50 to engage aperture 72 and lock telescoping shaft 28 in its uppermost position. Also, a lock pin 74 extends through lock pin opening 42 when telescoping shaft 28 is in its upwardmost position.

As shown most clearly in FIGS. 11 and 12, friction roller 76 is journaled in the forwardmost end of telescoping shaft 28. As telescoping shaft 28 is extended downwardly and rearwardly, the friction roller 76 engages a wall of tubular housing 26 and minimizes the frictional drag to allow free extension of the shaft 28. Also, telescoping shaft 28 includes a forward wall 29 through which a stop rod 78 extends. Stop rod 78 extends through forward wall 27 of tubular housing 26 and is held in position by nut 79 secured to the forwardmost end of stop rod 78. The rearwardmost end of stop rod 78 carries stop nut 80 which engages the forward wall 29 of telescoping shaft 28 when shaft 28 is extended, as shown in the dashed lines illustration in FIG. 11.

The hitching guide 20 is adapted for use with a pick-up truck, as illustrated in FIGS. 1 through 12, inclusive. In operation, the pick-up truck is backed to the vicinity of a draft tongue 1 having a swivel ball connector 3 attached to the distal end thereof. Draft tongue 1 is elevated by elevator block 5 such that the opening in the swivel ball connector 3 is elevated above the ground. When the truck is backed into position, the operator exerts a lateral force on lever 56 causing pin 50 to be extracted from aperture 72 thus freeing telescoping shaft 28. The forward tab 68 of release pin stop 62 falls by gravity and engages the enlarged portion 52 of release pin 50 and hold release pin 50 outward from telescoping shaft 28, thus eliminating frictional drag as telescoping shaft 28 is extended. Further, friction roller 76 engages the inside surface of the tubular housing 26 and decreases the frictional drag as the telescoping shaft 28 moves downward and to the rear until it either contacts the ground, or the forward wall 29 of telescoping shaft 28 contacts stop nut 80.

The guide block 30 is lowered to the first hitching position, as shown by dashed lines in FIG. 1, and the truck 10 is backed up until the draft tongue 1 makes contact with guide block 30, as illustrated in FIGS. 4 and 5. As the pick-up truck 10 is further backed up, draft tongue 1 travels along the surface of the forwardly converging side 32 until it is aligned directly over hitch pin 38, as shown in FIG. 6. The opening in the swivel ball connector 3 then engages the upper tapered portion 40 of hitch pin 38. As the pick-up is further backed up, the telescoping shaft 28 is forced forwardly and upwardly into the housing 26 while at the same time swivel ball connector 3 slides down the shaft of hitch pin 38 and rests on base 34 where it is spaced rearwardly of sides 32, as most clearly shown in FIG. 11. This rearward spacing results since, at the point of convergence of sides 32, sides 32 are inclined toward the hitch pin 38 in a non-parallel relationship. The rearward spacing of the draft tongue 1 from sides 32, together with the open area lateral of the hitch pin 38, allows for unrestricted lateral movement of the draft tongue 1 when the guide block 30 is in the second raised hitched position.

When the telescoping shaft 28 is fully retracted, latch release 44 engages rearward tab 70 of release pin stop 62, forcing forward tab 68 to disengage from the enlarged portion 52 of release pin 50. This allows release pin 50 to engage aperture 72, thus locking the telescoping shaft 28 in the raised hitched position. Simultaneously, lock pin 74 extends through lock pin opening 42 until it is adjacent to the tapered portion 40 of hitch pin 38. Lock pin 74 thus prevents the upward movement of draft tongue 1, so that draft tongue 1 is locked into the second raised hitched position, as shown in FIGS. 10 and 11.

When it is desired to unhitch the draft tongue 1, the operator simply exerts an outward force on lever 56 which allows telescoping shaft 28 to extend downwardly and rearwardly until the guide block 30 reaches the ground. As the guide block 30 reaches the ground, the elevator block 5 acts to elevate the swivel ball connector 3 above the upper portion 40 of hitch pin 38, thus uncoupling the truck 10 from the draft tongue 1. The operator then manually raises the guide block 30 to the upper locked position.

FIGS. 13 through 17 illustrate an alternate embodiment of the hitching guide 120 adapted for use in conjunction with a conventional tractor 110. The tractor 110 has a power-lift system including a pair of generally vertically and laterally swingable draft links 112 connected at their forward ends for universal movement relative to the tractor 110. The draft links 112 are operably connected to a rockshaft 114 which forms a part of the hydraulic power-lift system carried by and forming a part of the tractor 110. The tractor 110 also includes a drawbar 116 connected at its forward end to the tractor 110 to receive draft power therefrom.

As best shown in FIGS. 13 and 15, the hitching guide 120 includes a mounting bar 122 having a forward end thereof attached to drawbar 116 by adjustable clamp plate 124. Swivel ball connector 126, formed in the forward end of mounting bar 122, is attached to the underside of adjustable clamp plate 124 and secured thereto by pin 128. Thus, downward and lateral movement of mounting bar 122 is provided for.

A guide block 130 is mounted on the rearward end of mounting bar 122. Guide block 130 includes forwardly converging sides 132 extending upwardly from base 134. The upper edge of converging sides 132 includes a rearwardly extending flange 136. A hitch pin 138 extends upwardly from base 134 and terminates in an upper tapered portion 140. A pair of upwardly diverging guide bars 142 are secured to mounting bar 122 and are connected to draft links 112 by connectors 144 and chains 146. A spring biased lock pin 148 is secured to the forward side of guide block 130 and is extendable through a lock pin opening 150 formed at the point of convergence of sides 132. Lock pin 148 is extendable through opening 150, and spring biased away from opening 150. Spring bar 152 is attached to mounting bar 122 at its forward end, and the rearward end of spring bar 152 is disposed to contact spring biased lock pin 148. A safety lock bracket 154 is secured to mounting bar 122 and includes openings 156 adapted to receive bolt 158.

In operation, the tractor 110 is backed to a position near the draft tongue 1. The draft tongue 1 includes a swivel ball connector attached to the distal end thereof, and draft tongue 1 is supported above the ground by elevator block 5. The draft links 112 are lowered, thus allowing the hitching guide 120 to be lowered until the guide block 130 contacts the ground. The tractor 110 is then further backed up such that the draft tongue 1 contacts converging sides 132 until the opening of swivel ball connector 3 is aligned directly above hitch pin 138. At this point, the distal end of draft tongue 1 is in contacting relationship with the point of convergence of sides 132 and the opening in swivel ball connector 3 is aligned to receive the tapered portion 140 of hitch pin 138.

The draft links 112 are then raised, thus causing hitch pin 138 to be received within the opening of swivel ball connector 3. As the draft links continue to rise, the guide bars 142 contact drawbar 116 and align the mounting bar 122 therewith. As the draft links 112 are raised to the uppermost hitched position, the bottom surface of the drawbar 116 contacts the top surface of spring bar 152 forcing the forward end thereof against spring biased lock pin 148 which then extends through opening 150.

As most clearly shown in full line drawing in FIG. 17, the spring biased lock pin 148 extends to a point adjacent to hitch pin 138 above draft tongue 1, thus locking draft tongue 1 in the second hitched position. Once the hitching guide 120 is fully raised to the second hitched position, bolt 158 is inserted through openings 156 to lock the hitching guide 120 in the hitched position, thus preventing inadvertent unhitching.

When it is desired to unhitch the draft tongue 1, bolt 158 is removed from openings 156 and the draft links 112 are lowered until the guide block contacts the ground. The elevator block 5 acts to raise swivel ball connector 3 above the uppermost portion of the hitch pin 138, and the tractor 110 is pulled forward. The hitching guide 120 is then raised by raising the draft links 112 and the hitching guide 120 is thus prepared for the transport position, once the bolt 158 is reinserted in openings 156.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise then as specifically described.

I claim:

1. A hitching guide for connecting a trailing implement draft tongue to a draft vehicle, said draft tongue having an aperture formed near the distal end thereof, said hitching guide comprising:

a frame attached to said draft vehicle;

a guide block mounted on said frame and including forwardly converging sides disposed to contact the draft tongue and coaxially align the draft tongue to a first hitching position wherein said draft tongue aperture is disposed in coaxially aligned relationship with a hitch pin; and means for spacing said draft tongue from said converging sides as said draft tongue moves from said first hitching position to a second hitched position wherein said draft tongue is releasably attached to said hitch pin.

2. The hitching guide of claim 1 wherein said hitch pin extends vertically upward from said guide block and said sides extend upwardly and are inclined toward said hitch pin, thereby forming said spacing means.

3. The hitching guide of claim 1 wherein said forwardly converging sides are vertically spaced from said hitch pin whereby the draft tongue is free to pivot laterally beyond said converging sides when said draft tongue is in said second hitched position.

4. The hitching guide of claim 1 wherein said forwardly converging sides include a rearwardly extending flange at the upper edge thereof, whereby the draft tongue is restrained from upward movement once contact is made with said converging sides.

5. The hitching guide of claim 1 wherein said hitch pin includes an upper tapered portion.

6. The hitching guide of claim 1 wherein said draft tongue includes a swivel ball connector having an opening disposed to matingly engage said hitch pin.

7. The hitching guide of claim 1 wherein said draft tongue includes an elevator block attached thereto disposed to elevate the distal end of said draft tongue above the ground.

8. The hitching guide of claim 1 further including means for moving said guide block between said first hitching position and said second hitched position.

9. A hitching guide for connecting a trailing implement draft tongue to a draft vehicle, said hitching guide comprising:
   a frame attached to said draft vehicle, said frame comprising:
      a tubular housing;
      a telescoping shaft slideably movable within said tubular housing, wherein said guide block is mounted on one end of said telescoping shaft; and
      means for releasably locking said telescoping shaft in a second hitched position;
   a guide block mounted on said frame and including forwardly converging sides disposed to contact and laterally align the draft tongue to a first hitching position wherein said draft tongue is disposed in aligned relationship with a hitch pin; and
   means for spacing said draft tongue from said converging sides as said draft tongue moves from said first hitching position to said second hitched position wherein said draft tongue is releasably attached to said hitch pin.

10. The hitching guide of claim 9 wherein said releaseable locking means includes a release pin disposed to engage registerable openings in said tubular housing and said telescoping shaft, said release pin being movable between an engaged position and a disengaged position with respect to said registerable openings.

11. The hitching guide of claim 10 wherein said release pin is attached to said tubular housing and is biased toward said engaged position.

12. The hitching guide of claim 11 further including a release pin stop pivotally attached to said frame and disposed to releaseably contact said release pin to hold said release pin in said disengaged position.

13. The hitching guide of claim 12 further including a latch release mounted on said telescoping shaft and disposed to contact said release pin stop when said guide block is raised to said second hitched position, whereby said release pin stop disengages said release pin and allows said release pin to move to said engaged position.

14. A hitching guide for connecting a trailing implement draft tongue to a draft vehicle wherein said draft vehicle includes a drawbar, said hitching guide comprising:
   a frame attached to said draft vehicle, said frame including:
      a mounting bar pivotally attached below said drawbar for vertical and lateral movement with respect thereto; and
      means for releasably locking said mounting bar in a second hitched position;
   a guide block mounted on said frame and including forwardly converging sides disposed to contact and laterally align the draft tongue to a first hitching position wherein said draft tongue is disposed in aligned relationship with a hitch pin; and
   means for spacing said draft tongue from said converging sides as said draft tongue moves from said first hitching position to said second hitched position wherein said draft tongue is releasably attached to said hitch pin.

15. The hitching guide of claim 14 wherein said releasable locking means includes a saftey lock bracket attached to said mounting bar and extending upwardly therefrom and disposed on opposite sides of and above said drawbar when said guide block is raised to said second hitched position, said safety lock bracket having registerable openings therein; and a bolt disposed to engage said registerable openings above said drawbar, thereby preventing the inadvertent lowering of said mounting bar.

16. A hitching guide for connecting a trailing implement draft tongue to a draft vehicle, said hitching guide comprising:
   a frame attached to said draft vehicle;
   a guide block mounted on said frame and including forwardly converging sides disposed to contact and laterally align the draft tongue to a first hitching position wherein said draft tongue is disposed in aligned relationship with a hitch pin; and
   means for spacing said draft tongue from said converging sides as said draft tongue moves from said first hitching position to a second hitched position wherein said draft tongue is releasably attached to said hitch pin, wherein said hitch pin extends vertically upward from said guide block and said sides extend upwardly and are inclined toward said hitch pin, thereby forming said spacing means; and
   a draft tongue lock pin attached to said frame and movable between a locked position wherein said lock pin is disposed adjacent to said hitch pin and above said draft tongue when said guide block is in the second hitched position, and an unlocked position when said guide block is in the first hitching position.

17. The hitching guide of claim 16 wherein said converging sides have an opening formed at the point said converging sides join, and wherein said draft tongue lock pin extends through said opening when said guide block is in the second hitched position.

18. The hitching guide of claim 17 wherein said frame includes a tubular housing, a telescoping shaft slideably movable within said tubular housing, said guide block being mounted on one end of said telescoping shaft; and wherein said draft tongue lock pin is rigidly attached to said tubular housing.

19. The hitching guide of claim 17 wherein said draft vehicle includes a drawbar, said frame includes a mounting bar pivotally attached below said drawbar for vertical and lateral movement with respect thereto; and wherein said draft tongue lock pin is movably attached to said guide block and biased toward the unlocked position.

20. The hitching guide of claim 19 further including a spring bar attached to the upper side of said mounting bar and disposed in contacting relationship with said biased draft tongue lock pin and disposed in contacting relationship with said drawbar when said guide block is raised to the second hitched position.

21. A hitching guide for connecting a trailing implement draft tongue to a draft vehicle, said draft tongue having an aperture formed near the distal end thereof, said hitching guide comprising:
   a frame attached to said draft vehicle;
   a guide block mounted on said frame and including forwardly converging sides disposed to contact the draft tongue and coaxially align the draft tongue aperature to a first hitching position wherein said draft tongue aperature is disposed in coaxially aligned relationship with a hitch pin; and wherein said forwardly converging sides are vertically spaced from said hitch pin whereby the draft tongue is free to pivot laterally beyond said converging sides when said draft tongue is in a second hitched position.

* * * * *